(12) United States Patent
Linden

(10) Patent No.: US 6,493,943 B1
(45) Date of Patent: Dec. 17, 2002

(54) CUTTING TOOL, PARTICULARLY HEDGE SHEARS

(75) Inventor: Olavi Linden, Billnäs (FI)

(73) Assignee: Fiskars Consumer Oy Ab, Billnas (FI)

( * ) Notice: Subject to any disclaimer, the term of this patent is extended or adjusted under 35 U.S.C. 154(b) by 0 days.

(21) Appl. No.: 09/607,635

(22) Filed: Jun. 30, 2000

(51) Int. Cl.$^7$ .............................................. B26B 13/26
(52) U.S. Cl. ...................................................... 30/252
(58) Field of Search ........................... 30/252, 254, 191

(56) References Cited

U.S. PATENT DOCUMENTS

| | | | |
|---|---|---|---|
| 180,410 A | * 8/1876 | Austin | 30/252 |
| 625,896 A | 5/1899 | O'Dell | |
| 1,716,257 A | * 6/1929 | Blodgett | 30/252 |
| 2,287,303 A | 6/1942 | Habart et al. | 30/252 |
| 3,372,478 A | 3/1968 | Wallace et al. | 30/193 |
| 4,644,652 A | 2/1987 | Davis | 30/252 |

FOREIGN PATENT DOCUMENTS

| | | | |
|---|---|---|---|
| RU | 872068 | * 10/1981 | 30/252 |
| WO | WO 95/05271 | 2/1995 | |

* cited by examiner

*Primary Examiner*—Douglas D. Watts
(74) *Attorney, Agent, or Firm*—Foley & Lardner

(57) ABSTRACT

A cutting tool, particularly hedge shears, comprising a first elongated handle member, a second elongated handle member pivotally connected to the first handle member at a first pivot point, a first blade member having a cutting edge and being pivotally connected to the first handle member at a second pivot point, a second blade member having a cutting edge and being pivotally connected to the second handle member at a third pivot point, the first and the second blade members being pivotally connected to each other at a fourth pivot point, the blade members being turnable relative to the fourth pivot point so that their cutting edges move in a scissor-like manner between an open and a closed position, the first, second, third and fourth pivot points forming a quadrangle in which an angle the vertex of which is formed by the first pivot point is approaching but not reaching 180° when the blade members are approaching their closed position, whereby the work done to close the shears creates a force which tends to close the blade members and is the bigger the closer the blades are to their closed position.

6 Claims, 4 Drawing Sheets

CUTTING TOOL, PARTICULARLY HEDGE SHEARS

FIELD OF THE INVENTION

The present invention relates to a cutting tool in general and to hedge shears in particular.

BACKGROUND OF THE INVENTION

Conventional manual hedge shears, most often used for cutting shrubs and hedges, comprise two handles with blades arranged as axial extensions of the handles. These handle-and-blade combinations are pivoted together at one point, the pivot point being typically located on the blades, close to the point where the blades are attached to the handles. The blades are arranged to cross so that, when they are moved back and forth, a cutting scissor action is produced. The cutting force that can be applied to the branches to be cut with these conventional hedge shears is directly proportional to the force used for bringing the handles toward each other. This is based on a typical lever construction where the cutting force can be increased by extending the length of the handles, i.e. the operating levers; however, this is only possible to a very limited extent without the shears becoming unreasonably clumsy to use. Due to direct force transmission, manual hedge shears are relatively heavy to use, particularly on shrubs with even slightly thicker branches.

SUMMARY OF THE INVENTION

It is an object of the invention to present a cutting tool, particularly hedge shears, where an improved cutting force has been achieved without the tool becoming unreasonably clumsy or structurally complex and unreliable. This is achieved with the a cutting tool, particularly hedge shears, of the invention comprising a first elongated handle member;

a second elongated handle member pivotally connected to the first handle member at a first pivot point;

a first blade member having a cutting edge and being pivotally connected to the first handle member at a second pivot point; and a second blade member having a cutting edge and being pivotally connected to the second handle member at a third pivot point, the first and the second blade member being pivotally connected to each other at a fourth pivot point, the blade members being turnable relative to the fourth pivot point so that their cutting edges move in a scissor-like manner between an open and a closed position, the first, second, third and fourth pivot point forming a quadrangle in which an angle the vertex of which is formed by the first pivot point is approaching but not reaching 180° when the blade members are approaching their closed position, whereby the work done to close the shears creates a force which tends to close the blade members and is the bigger the closer the blades are to their closed position.

The idea of the invention is to provide a pivot mechanism which allows the cutting force to be significantly increased particularly towards the end of the cutting operation, without increasing the strain experienced by the user.

Other advantages of the invention will become apparent from the detailed description given hereinafter. It should be understood, however, that the detailed description and specific embodiments are only given by way of illustration since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements

DETAILED DESCRIPTION OF A PREFERRED EXEMPLARY EMBODIMENT

Figure 1:
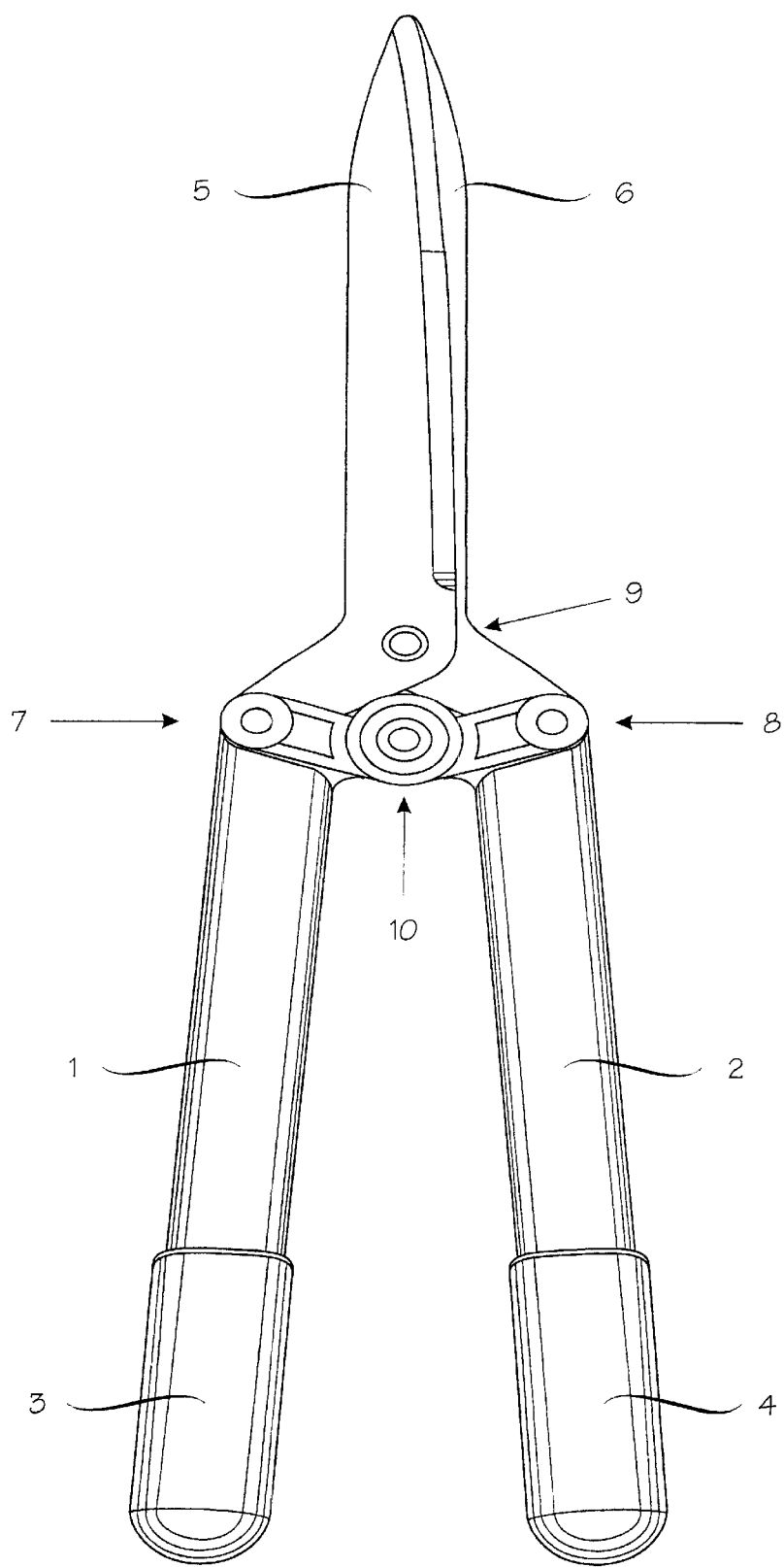
FIG. 1 illustrates an exemplary embodiment of a cutting tool of the invention in their closed position.

FIG. 1 shows a top view of an exemplary embodiment of a cutting tool, particularly hedge shears, of the invention in their closed position. The shears comprise a first handle 1 and a second handle 2. The handles are elongated and provided with portions 3 and 4 arranged close to one end of the handles for better grip. The handles are made of a moldable material, possibly with the exception of the portions 3 and 4. A moldable material to be particularly considered is plastic, although some metal materials, particularly light metals, may also be possible. The handles 1 and 2 are attached to a first blade 5 and a second blade 6, respectively, at the handle ends opposite to the gripping portions 3 and 4. With regard to their cutting portions, the blades 5 and 6 are similar to those of conventional hedge shears, and therefore they will not be described in greater detail in this context. The blade 5 is pivotally connected to the handle 1 at a pivot point 7. The blade 6 is correspondingly attached to the blade 2 at a pivot point 8. Further, the blades 5 and 6 are pivoted together at a pivot point 9, and the handles 1 and 2 are pivoted together at a pivot point 10. The structure and operation of the pivot construction thus formed will be described below in substantially greater detail.

Figure 4:
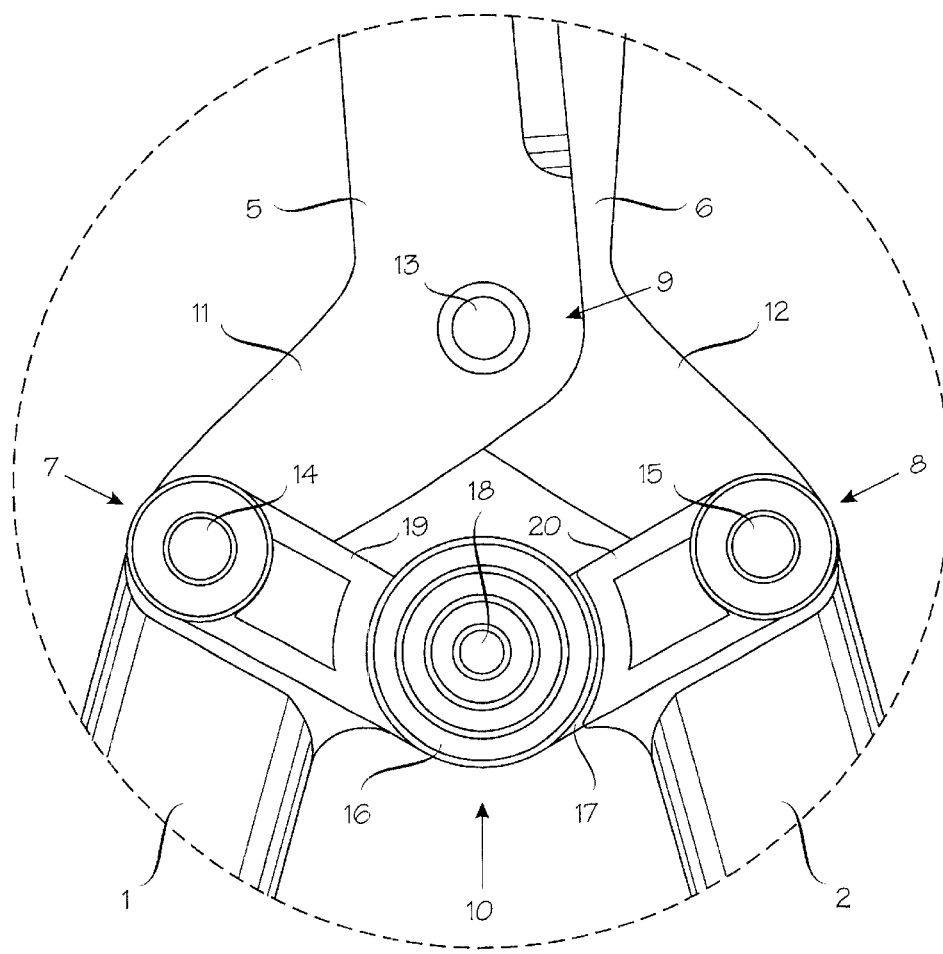
FIG. 4 is a partial enlargement of section A shown in FIG. 3.

The above pivot construction comprising four pivot points is shown in greater detail in FIG. 4. As stated above, the blades 5 and 6 are formed so that after the pivot point 9, they comprise portions 11 and 12 bent outward with regard to the symmetry axis of the shears, the portions thus forming an angle of about 55° to the longitudinal axes of the blades, when seen from the direction of the blades 5 and 6, respectively. In other words, after the pivot point 9 the blades are no longer straight, but they are at an angle to the longitudinal axes of the blades due to which the blades do not cross at the pivot point 9 as they do in conventional scissors or hedge shears.

The blade portions 11 and 12 are relatively short compared with the length of the blades 5 and 6. It is pointed out that the blades 5 and 6 are most preferably fully identical. Such blades are most commonly made of steel and they are pivotally connected at the pivot point 9 by means of an axle stub, pin or rivet 13 made of metal. More complex, jewelled pivot constructions could naturally also be possible, but they are not needed in ordinary hedge shears.

The free end of the portion 11 of the blade 5 is pivotally connected to the end of the handle 1 at the pivot point 7. Correspondingly, the portion 12 of the blade 6 is pivotally connected, in a fully similar manner, at its free end to the handle 2 at the pivot point 8. The pivot points 7 and 8 are formed by making a groove or a slot to the handles 1 and 2 when they are molded, the free ends of the blade portions 11 and 12 being then placeable into the groove or slot. At the free ends of the blade portions 11 and 12, annular holes are made through the blade portions. Correspondingly, the points in the walls defining the slots formed at the ends of the handles 1 and 2 that coincide with the holes at the free ends of the blades are also provided with annular holes. The axle stubs 14 and 15, respectively, being then introduced through these coinciding holes, the blades 5 and 6 become pivotally connected to the handles 1 and 2. The axle stubs 14 are most preferably metal taps. They are arranged to the blades 1 and 2 by hitting them through the holes reserved for them on the handles, the holes being made tight so as to suitably lock the stubs in place with respect to the handles 1 and 2. The diameter of the holes at the free blade ends being made slightly larger than the diameter of the axle stubs 14 and 15 allows the blades to turn freely with respect to the axle stubs 14 and 15 without turning motion acting on the axles stubs themselves, which might weaken the joint at the handles 1 and 2.

The pivot joint 10 that joins the handles 1 and 2 together is located between the handles 1 and 2, at the same end of the handles as the pivot points 7 and 8, which are at the outer edge of the handles. The pivot point 10 is arranged at a suitable and equal distance from both pivot points 7 and 8 by molding the handles so that protrusions 19 and 20, respectively, projecting sideways from the handles are provided between the handles. The pivot point 10 is made by providing the end of the protrusion 19 on the handle 1 with two flange-like, parallel portions of which only the top portion denoted with reference 16 is visible. Correspondingly, the protrusion 20 on the handle 2 is provided with one flange-like portion which sets between the flange-like portions 16 of the handle 1. FIG. 4 shows only a small part of this portion, which is denoted with reference 17. The flanges 16 and 17 are both provided with an annular hole into which an axle stub 18 has been inserted. This joins the handles 1 and 2 together, the pivoted point 10 being thereby provided between the handles. The holes of the flanges 16 and 17 can be dimensioned either so as to make the axle stub lock with respect to the flanges 16 or with respect to the flange 17 arranged between the flanges 16. With this arrangement, the axle stub preferably only turns with respect to one of the handles but not the other. This allows to prevent the loosening of the pivot joint and to ensure that the axle stub 18 stays in place.

In the construction of the invention, the straight line passing through the centres of the pivot points 1 and 10, i.e. the axle bolts 14 and 18, forms an angle which is relatively close to 90°, in practice between 80 and 85°, to the longitudinal axis of the handle 1. This angle has an impact particularly on the position of the handles when the blades are closed, which in turn is most important with regard to the ergonomics of the shears.

The primary object and idea of the shears of the invention are to use the above described pivot construction so as to significantly increase the cutting force of the blades when the blades 5 and 6 are approaching their closed position, without an extra effort being required from the user. An essential aspect in achieving this object is that in the quadrangle formed by the pivot points 7–10, the angle opposite to the pivot point 9, i.e. the angle the vertex of which is at the pivot point 10, or the axle stub 18, and the sides of which are formed by line segments between the pivot points 10 and 7, i.e. the axle stubs 18 and 14, and between the pivot points 10 and 8, i.e. the axle stubs 18 and 15, respectively, the value of the angle approaches but does not reach 180°, when the blades 5 and 6 approach their closed position.

Figure 2:
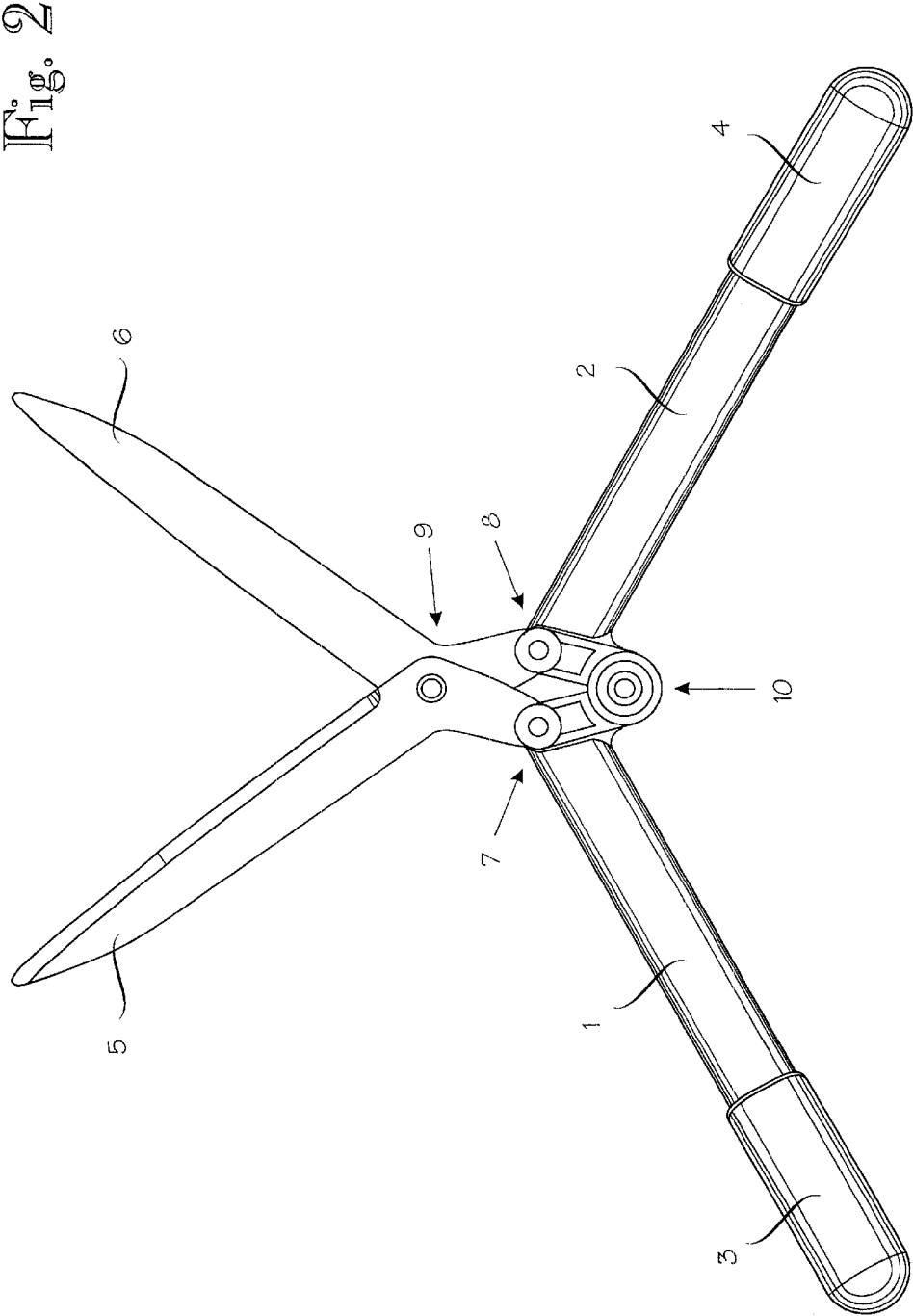
FIG. 2 illustrates the cutting tool of FIG. 1 in their open position.
Figure 3:
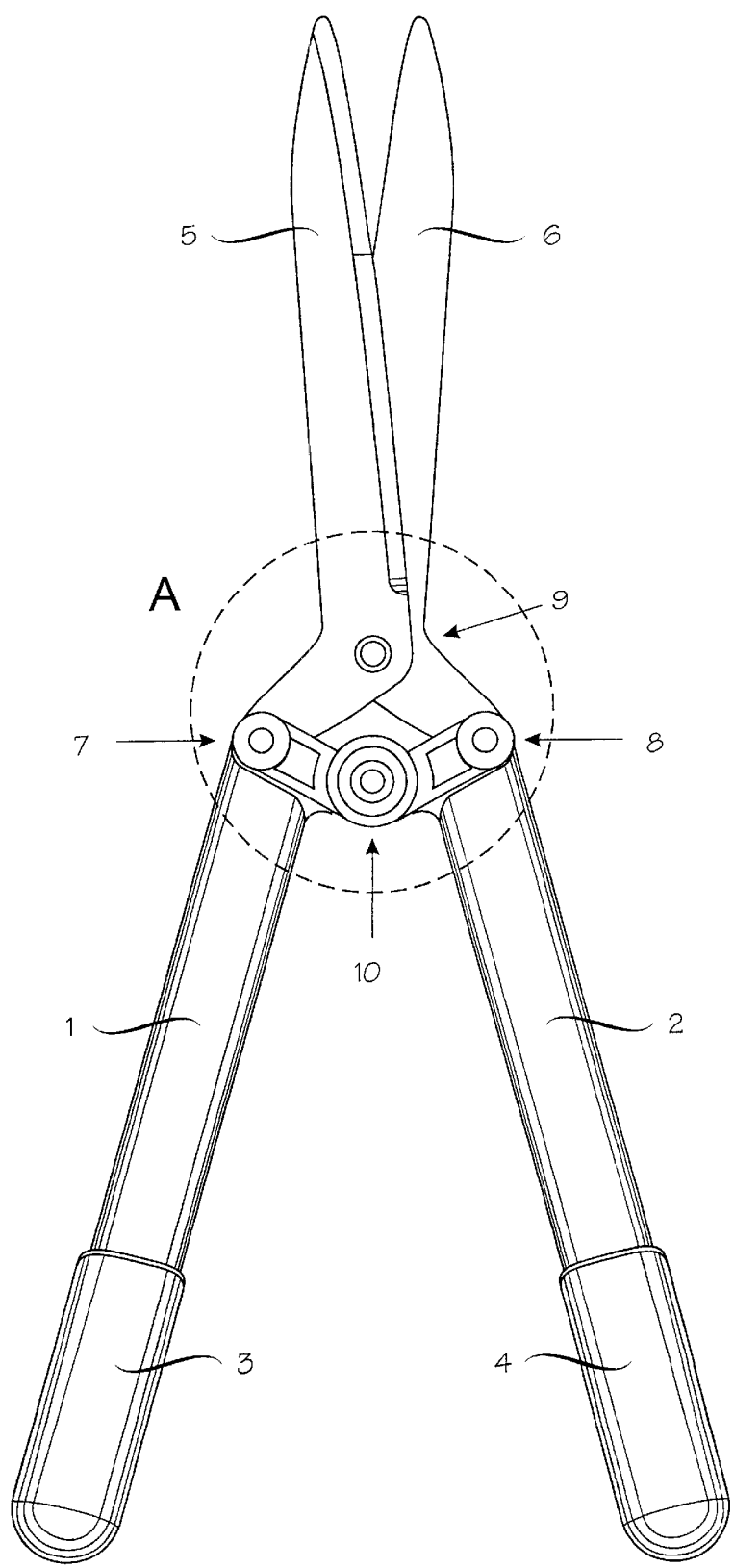
FIG. 3 illustrates the cutting tool of FIG. 1 in a slightly opened position.

The above stated basic principle can be examined with reference to FIG. 2 where the shears are shown in their open position. In this situation both the handles 1 and 2 and their respective blades 5 and 6 are relatively far apart from each other and, as already stated, they are open. When the handles 1 and 2 are then being turned about the pivot point 10 towards each other, the pivot points 7 and 8 move farther apart from each other, thus causing the blades 5 and 6 to approach each other. FIG. 3 shows this intermediate position which is arrived at when starting from the initial situation shown in FIG. 2. The change in the above described angle, i.e. the vertex of which is at the pivot point 10 and the sides of which are formed by line segments between the pivot points 10 and 7, and 10 and 8, respectively, being thought of as a function of distance between the pivot points 7 and 8, the following formula can be created where the angle is a and the distance between the pivot points 7 and 8 is s, the distance between the pivot points 7 and 10, and 8 and 10, respectively, being c.

$$s = 2 \cdot c \cdot \sin\frac{\alpha}{2}$$

When the angle α of the above equation approaches 180°, i.e. the angle $$\frac{\alpha}{2}$$

approaches 90°, the expression sinα/2 slowly approaches 1. Consequently, when the angle a is close to 180°, the distance s between the pivot points 7 and 8 grows only a little as the angle α changes. From this follows that, when the work done via the pivot construction remains constant during all the time the shears are being closed, the change in the distance between the pivot points 7 and 8 and, correspondingly, the distance covered by the blades 5 and 6 with respect to the movement taking place between the handles 1 and 2 is very small at the final cutting phase. Consequently, given that the work done via the pivot construction remains constant, and work being expressed as force multiplied by distance, then a short distance leads unavoidably to a great force. Theoretically, if the pivot point 10 were located exactly in the middle of the pivot points 7 and 8, i.e. the angle α were 180°, the force moving the pivot points 7 and 8 away from each other would be infinite. For practical reasons however, it is not reasonable to produce this kind of a construction, but it is better to accept that, when the blades 5 and 6 are closed, the angle α approaches but does not reach 180°. FIG. 1 illustrates this situation, the angle in the embodiment of the Figure being about 160° when the blades are closed.

As has been described above, the construction of the shears of the invention with respect to their longitudinal axis is substantially symmetrical, the symmetry axis of the construction passing through the pivot points 9 and 10. The only difference in symmetry is in the construction of the pivot point 10, as described above. This means that the distance between the pivot points 7 and 10 is equal to that between 8 and 10, as well as the distance between the pivot points 7 and 9 is equal to that between 8 and 9. In practice, the distance between the pivot points 7 and 10 and the points 8 and 10, respectively, is mainly significant with regard to the distance between the handles 1 and 2 when the shears are closed. Naturally the length of the handle in relation to the distance between the pivot points 7 and 10 has an impact on the force exerted on the pivot point 10 from the handle.

The distance between the pivot points 7 and 9 and the points 8 and 9, respectively, also has an effect on the operation of the hedge shears of the invention. On one hand, to obtain good ergonomic qualities the point 9 should most preferably be relatively close to the pivot point 10 so that the shears can be made practical and they can be provided with long blades without impairing their practicality. On the other hand, by bringing the pivot point 9 farther away from the points 7 and 8, the length of the levers between the points 7 and 9 and points 8 and 9, respectively, would be increased, which would further increase the cutting force of the blades. However, the pivot construction of the invention allows the levers to be made short, without reducing the cutting force obtained. When the blades are open, which is the situation shown in FIG. 2, cutting force between the blades 5 and 6 is hardly needed at all, because the blades only move the shrub branches between the blades closer to each other, and it is only just before the blades close, i.e. in the situation shown in FIG. 3, that the actual cutting force is needed. The pivot construction of the invention allows the force needed towards the end of the cutting operation to be extremely well provided.

What is claimed is:

1. A cutting tool, particularly hedge shears comprising:
   a first elongated handle member;
   a second elongated handle member pivotally connected to the first handle member at a first pivot point;
   a first elongated blade member having a cutting edge extending substantially along its length and being pivotally connected to the first handle member at a second pivot point;
   a second elongated blade member having a cutting edge extending substantially along its length and being pivotally connected to the second handle member at a third pivot point, the first handle member and the first blade member being substantially symmetric to the second handle member and the second blade member, the first and second blade members being pivotally connected to each other at a fourth pivot point, the blade members being turnable relative to the fourth pivot point so that their cutting edges move in a scissor-like manner between an open and a closed position, the first, second, third and fourth pivot points forming a quadrangle in which an angle the vertex of which is formed by the first pivot point is at least about 160 degrees and approaching but not reaching 180° when the blade members are approaching their closed position, whereby the work done to close the shears creates a force which tends to close the blade members and is the bigger the closer the blades are to their closed position.

2. A cutting tool according to claim 1, wherein the first and the second handle members are of a moldable material.

3. A cutting tool according to claim 1, wherein the distances between the first and the second pivot point and the first and the third pivot point are identical.

4. A cutting tool according to claim 1 or 3, wherein the distances between the fourth and the second pivot point and the fourth and the third pivot point are identical.

5. A cutting tool according to claim 1, wherein the second and the third pivot point are situated at a distal end of the first and the second handle member respectively and the first pivot point connecting the first and the second handle member is formed of parts integral with the first and the second handle members, respectively, and situated at the same distal end of the handle members as the second and third pivot point, but at a distance from said second and third pivot point.

6. A cutting tool according to claim 5, wherein a straight line passing through the second and the first pivot point forms an angle of less than 90° to the longitudinal axis of the first handle member.

* * * * *